United States Patent
Fukushima et al.

(10) Patent No.: US 12,166,932 B2
(45) Date of Patent: Dec. 10, 2024

(54) INFORMATION PROCESSING DEVICE AND INFORMATION PROCESSING PROGRAM

(71) Applicant: FUJIFILM CORPORATION, Tokyo (JP)

(72) Inventors: Tatsuo Fukushima, Kanagawa (JP); Yuji Onozawa, Kanagawa (JP); Takafumi Haruta, Kanagawa (JP); Yohei Makino, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/546,280

(22) PCT Filed: Feb. 7, 2022

(86) PCT No.: PCT/JP2022/004724
§ 371 (c)(1),
(2) Date: Aug. 14, 2023

(87) PCT Pub. No.: WO2022/176678
PCT Pub. Date: Aug. 25, 2022

(65) Prior Publication Data
US 2024/0121345 A1    Apr. 11, 2024

(30) Foreign Application Priority Data
Feb. 18, 2021 (JP) ................... 2021-024345

(51) Int. Cl.
*G06F 3/01* (2006.01)
*H04N 1/00* (2006.01)

(52) U.S. Cl.
CPC .......... *H04N 1/0049* (2013.01); *G06F 3/016* (2013.01); *H04N 1/00411* (2013.01); *H04N 1/00488* (2013.01)

(58) Field of Classification Search
CPC ............... H04N 1/0049; H04N 1/0041; H04N 1/00488; G06F 3/016
See application file for complete search history.

(56) References Cited

U.S. PATENT DOCUMENTS 11,809,700 B2 * 11/2023 Chaudhri ................. H04N 7/15
2007/0024597 A1    2/2007 Matsuoka
(Continued)

FOREIGN PATENT DOCUMENTS

| JP | 2007-34634 A | 2/2007 |
| JP | 2009-237820 A | 10/2009 |

(Continued)

OTHER PUBLICATIONS

English language translation of the following: Office action dated Jul. 30, 2024 from the JPO in a Japanese patent application No. 2021-024345 corresponding to the instant patent application.

*Primary Examiner* — Tadesse Hailu
(74) *Attorney, Agent, or Firm* — SOLARIS Intellectual Property Group, PLLC

(57) ABSTRACT

An image forming device includes a central processing unit (CPU). The CPU moves, in a case in which a user performs a movement operation on an operation part displayed on a display unit, the operation part in such a way as to follow the movement operation within a movable area including a start area that does not cause a predetermined function to be executed and an execution area that causes the predetermined function to be executed, executes the predetermined function in a case in which the movement operation is completed after the operation part is moved from the start area into the execution area by the movement operation, and performs control to change a reporting mode related to the movement operation in such a way that a degree of highlighting of the reporting mode related to the movement operation increases according to a position of the operation (Continued)

part as a degree of importance determined by an execution condition for the predetermined function becomes relatively higher during the movement operation on the operation part by the user.

10 Claims, 13 Drawing Sheets

(56) References Cited

U.S. PATENT DOCUMENTS

| | | | | |
|---|---|---|---|---|
| 2008/0074399 A1* | 3/2008 | Lee | ................... | H04M 1/72469 |
| | | | | 345/173 |
| 2008/0313568 A1* | 12/2008 | Park | ..................... | G06F 3/0486 |
| | | | | 715/835 |
| 2009/0113330 A1* | 4/2009 | Garrison | .............. | G06F 3/0486 |
| | | | | 715/769 |
| 2009/0213086 A1* | 8/2009 | Chae | ................... | G06F 3/04886 |
| | | | | 715/702 |
| 2010/0085318 A1* | 4/2010 | Lee | ...................... | G06F 3/0482 |
| | | | | 345/173 |
| 2010/0122194 A1* | 5/2010 | Rogers | ................. | G06F 3/0488 |
| | | | | 715/769 |
| 2010/0295805 A1* | 11/2010 | Shin | ...................... | G06F 3/0488 |
| | | | | 345/173 |
| 2011/0087981 A1* | 4/2011 | Jeong | .................... | G06F 3/0486 |
| | | | | 715/765 |
| 2011/0316797 A1* | 12/2011 | Johansson | ........... | G06F 3/04847 |
| | | | | 345/173 |
| 2012/0274587 A1 | 11/2012 | Matsuoka | | |
| 2014/0123044 A1* | 5/2014 | Xie | ....................... | G06F 3/0486 |
| | | | | 715/769 |
| 2014/0292668 A1* | 10/2014 | Fricklas | ................ | G06F 3/0488 |
| | | | | 345/173 |
| 2015/0067495 A1* | 3/2015 | Bernstein | ............ | G06F 3/04883 |
| | | | | 715/702 |
| 2017/0034328 A1* | 2/2017 | Lee | .................... | G06Q 30/0241 |
| 2018/0260109 A1* | 9/2018 | Yang | ....................... | H04L 51/42 |
| 2021/0165535 A1* | 6/2021 | Hyttnäs | ................ | G06F 3/0481 |

FOREIGN PATENT DOCUMENTS

| | | |
|---|---|---|
| JP | 2011-48832 A | 3/2011 |
| JP | 2012-113743 A | 6/2012 |
| JP | 2015-230516 A | 12/2015 |
| JP | 2018-153616 A | 10/2018 |
| JP | 2018-166943 A | 11/2018 |

\* cited by examiner

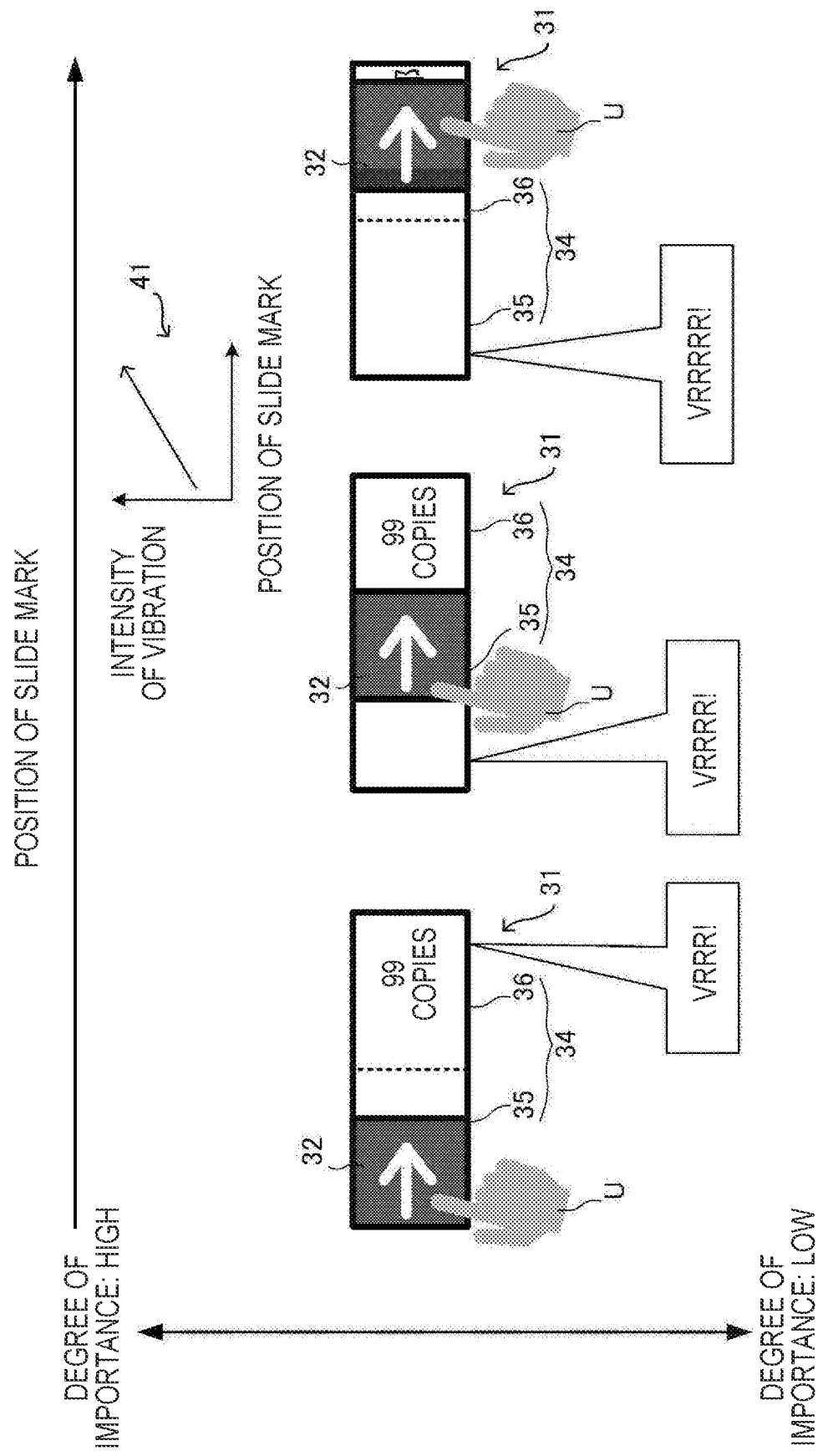

INFORMATION PROCESSING DEVICE AND INFORMATION PROCESSING PROGRAM

TECHNICAL FIELD

The present invention relates to an information processing device and an information processing program.

BACKGROUND ART

For example, Japanese Patent Application Laid-Open (JP-A) No. 2009-237820 describes a user interface control device that causes display means to display an operation screen and receives an operation from a user. The user interface control device includes a control unit that controls the operation screen based on a setting for the operation screen displayed on the user interface, and causes the user interface to display information regarding an erroneous operation on the operation screen in a case in which an input for changing the setting for the operation screen is received and the setting is changed based on the input.

SUMMARY OF INVENTION

Technical Problem

Meanwhile, a slide start using a touch button may be implemented on a touch panel type user interface (UI) screen. In the slide start, for example, a predetermined function is executed when the user performs an operation such as dragging or sliding on an operation part.

It is desirable from the viewpoint of preventing an erroneous operation that the user can grasp the degree of importance of a function executed by a movement operation in a case in which the user performs the movement operation on the operation part. However, with the slide start, it is not possible to grasp the degree of importance of the function executed by the movement operation during the movement operation.

An object of the present disclosure is to provide an information processing device and an information processing program capable of grasping the degree of importance of a function executed by a movement operation during the movement operation on an operation part by a user.

Solution to Problem

In order to achieve the above object, an information processing device according to a first aspect includes a processor, in which the processor moves, in a case in which a user performs a movement operation on an operation part displayed on a display unit, the operation part in such a way as to follow the movement operation within a movable area in which the operation part is movable and which includes a start area that does not cause a predetermined function to be executed and an execution area that causes the predetermined function to be executed, executes the predetermined function in a case in which the movement operation is completed after the operation part is moved from the start area into the execution area by the movement operation, and performs control to change a reporting mode related to the movement operation in such a way that a degree of highlighting of the reporting mode related to the movement operation increases according to a position of the operation part as a degree of importance determined by an execution condition for the predetermined function becomes relatively higher during the movement operation on the operation part by the user.

An information processing device according to a second aspect is the information processing device according to the first aspect, in which the change in reporting mode related to the movement operation includes a change in a display mode of at least one of the operation part or the movable area, and the processor performs control to change the display mode of at least one of the operation part or the movable area in such a way that a degree of highlighting of the display mode of at least one of the operation part or the movable area increases according to the position of the operation part as the degree of importance determined by the execution condition for the predetermined function becomes relatively higher.

An information processing device according to a third aspect is the information processing device according to the second aspect, in which the degree of highlighting of the display mode of at least one of the operation part or the movable area is expressed as a degree of change in color of at least one of the operation part or the movable area.

An information processing device according to a fourth aspect is the information processing device according to the second aspect or the third aspect, in which the processor performs control to change the display mode of at least one of the operation part or the movable area according to a type of the predetermined function in a case in which the user touches the operation part.

An information processing device according to a fifth aspect is the information processing device according to any one of the second aspect to the fourth aspect, in which the processor performs control to change the display mode of at least one of the operation part or the movable area in a case in which the operation part is moved into the execution area.

An information processing device according to a sixth aspect is the information processing device according to any one of the first to fifth aspects, in which the change in the reporting mode related to the movement operation includes a change in an output mode of at least one of sound or vibration from a reporting unit, and the processor performs control to change the output mode of at least one of the sound or the vibration from the reporting unit in such a way that a degree of highlighting of the output mode of at least one of the sound or the vibration from the reporting unit increases according to the position of the operation part as the degree of importance determined by the execution condition for the predetermined function becomes relatively higher.

An information processing device according to a seventh aspect is the information processing device according to the sixth aspect, in which the degree of highlighting of the output mode of at least one of the sound or the vibration from the reporting unit is expressed as a degree of change in output intensity, output pattern, or output time of at least one of the sound or the vibration from the reporting unit.

An information processing device according to an eighth aspect is the information processing device according to the sixth aspect or the seventh aspect, in which the processor performs control to change the output mode of at least one of the sound or the vibration from the reporting unit in a case in which the operation part is moved into the execution area.

An information processing device according to a ninth aspect is the information processing device according to any one of the sixth to eighth aspects, in which the processor does not perform control to change the output mode of at least one of the sound or the vibration from the reporting unit in a case of returning the operation part in a direction opposite to a direction from the start area toward the execution area.

Furthermore, in order to achieve the above object, an information processing program according to a tenth aspect causes a computer to: move, in a case in which a user performs a movement operation on an operation part displayed on a display unit, the operation part in such a way as to follow the movement operation within a movable area in which the operation part is movable and which includes a start area that does not cause a predetermined function to be executed and an execution area that causes the predetermined function to be executed; execute the predetermined function in a case in which the movement operation is completed after the operation part is moved from the start area into the execution area by the movement operation; and perform control to change a reporting mode related to the movement operation in such a way that a degree of highlighting of the reporting mode related to the movement operation increases according to a position of the operation part as a degree of importance determined by an execution condition for the predetermined function becomes relatively higher during the movement operation on the operation part by the user.

Advantageous Effects of Invention

According to the first aspect and the tenth aspect, there is an effect that it is possible to grasp the degree of importance of the function executed by the movement operation during the movement operation on the operation part by the user.

According to the second aspect, there is an effect that the degree of importance can be easily grasped as compared with a case in which the display mode of at least one of the operation part or the movable area is fixed.

According to the third aspect, there is an effect that the degree of importance can be easily grasped as compared with a case in which the color of at least one of the operation part or the movable area is fixed.

According to the fourth aspect, there is an effect that a function whose degree of importance is high can be grasped before the user performs the movement operation.

According to the fifth aspect, there is an effect that the user can grasp the position where the movement operation is to be completed as the display mode of at least one of the operation part or the movable area is changed.

According to the sixth aspect, there is an effect that the degree of importance can be easily grasped as compared with a case in which the output mode of at least one of the sound or the vibration from the reporting unit is fixed.

According to the seventh aspect, there is an effect that the degree of importance can be easily grasped as compared with a case in which the output intensity, the output pattern, or the output time of at least one of the sound or the vibration from the reporting unit is fixed.

According to the eighth aspect, there is an effect that the user can grasp the position where the movement operation is to be completed by changing the output mode of at least one of the sound or the vibration from the reporting unit.

According to the ninth aspect, there is an effect of preventing the user from being confused in a case in which the operation part is returned in the direction opposite to the direction from the start area toward the execution area.

BRIEF DESCRIPTION OF DRAWINGS

FIG. 13 is a diagram showing another example of the relationship between the degree of importance, a position of the slide mark, and a change in an output mode according to the second embodiment.

DESCRIPTION OF EMBODIMENTS

Figure 1:
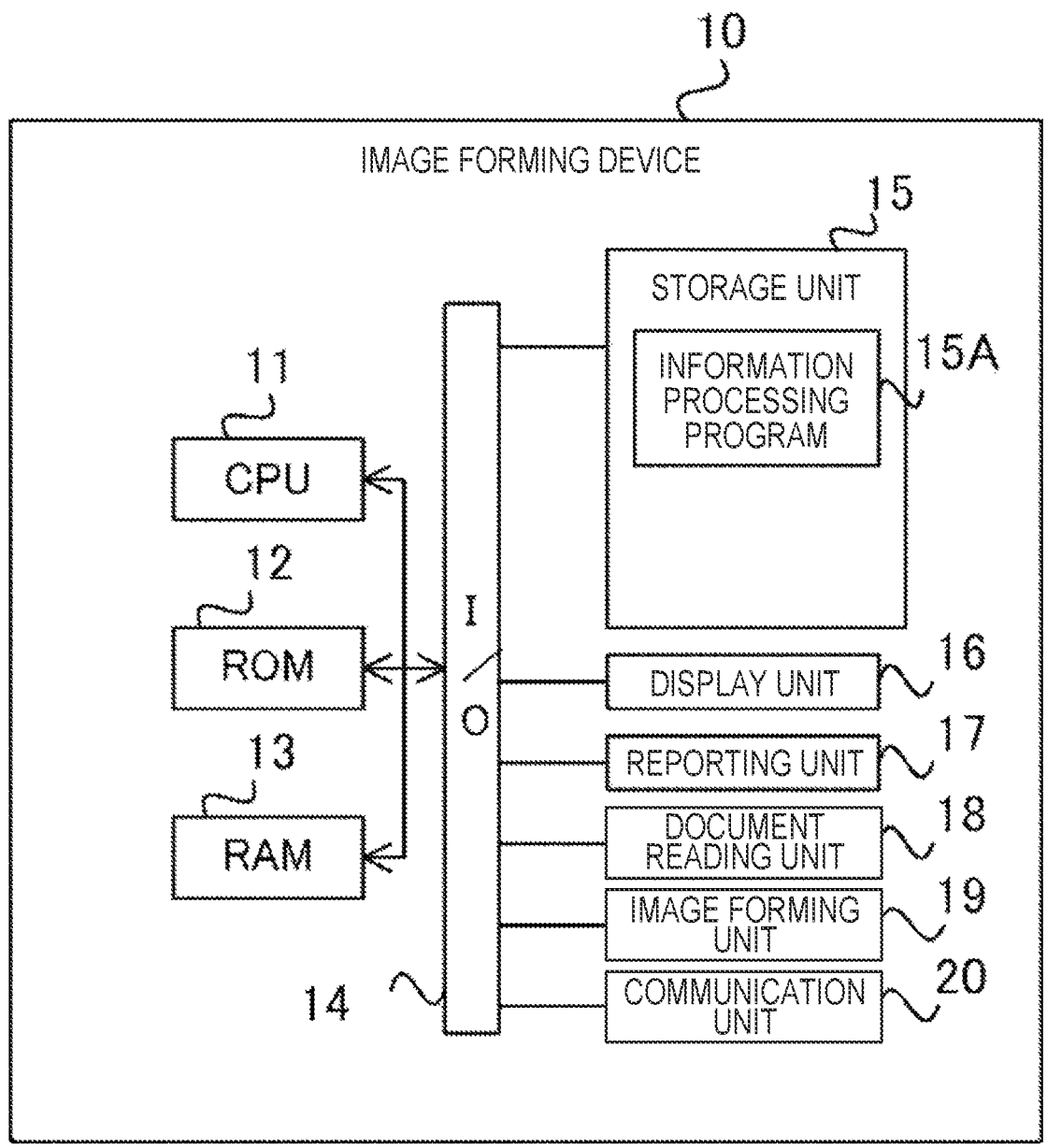
FIG. 1 is a block diagram showing an example of an electrical configuration of an image forming device according to a first embodiment.

Hereinafter, an example of a mode for carrying out the technology of the disclosure will be described in detail with reference to the drawings. Constituent elements and processing responsible for the same operation and function are denoted by the same reference numerals, and an overlapping description thereof may be omitted, if appropriate. Each drawing is only schematically illustrated enough to sufficiently understand the technology of the disclosure. The technology of the disclosure is not limited to examples in the drawings. In addition, in the present embodiment, a description of configurations that are not directly related to the present invention or well-known configurations may be omitted.

In the embodiment, an example of an information processing device that executes a predetermined function according to a manual user operation (hereinafter, referred to as a user operation) on an operation part such as a mark displayed on a display unit such as a display will be described.

In the disclosure, the "operation part" is a concept including an image displayed on the display unit such as a display. The "movement operation" is a concept including an instruction position being changed while being sequentially moved according to the user operation. Examples of the movement operation include a user operation of moving while touching the display unit such as a display, for example, a user operation in which a touching operation by the user is continued from a start point to an end point, such as dragging or sliding. The "start of the movement operation" is the start of the instruction from the user and may include a user operation of starting touching of the display unit such as a display. The "completion of the movement operation" is the end of the instruction from the user and may include a user operation of releasing the touch. The "predetermined function" is a concept including a predetermined instruction (command) executed by a processor and information indicating the instruction. Examples of the predetermined function include processing executed by the processor itself or another processor (for example, copying, printing, scanning, facsimile, and the like). The "execution of a function" is a concept including output of a predetermined instruction (command) executed by the processor and output of information indicating the instruction.

First Embodiment

FIG. 1 is a block diagram showing an example of an electrical configuration of an image forming device 10 according to a first embodiment.

As shown in FIG. 1, the image forming device 10 according to the present embodiment includes a central processing unit (CPU) 11, a read only memory (ROM) 12, a random access memory (RAM) 13, an input/output interface (I/O) 14, a storage unit 15, a display unit 16, a reporting unit 17, a document reading unit 18, an image forming unit 19, and a communication unit 20.

The image forming device 10 is an example of an information processing device. Examples of the information processing device according to the present embodiment include, in addition to the image forming device 10, general information processing devices having a UI screen adopting a touch panel system, such as a smartphone, a tablet terminal, and a game device.

Each of the CPU 11, the ROM 12, the RAM 13, and the I/O 14 is connected via a bus. The functional units including the storage unit 15, the display unit 16, the reporting unit 17, the document reading unit 18, the image forming unit 19, and the communication unit 20 are connected to the I/O 14. These functional units can communicate with the CPU 11 via the I/O 14.

The CPU 11, the ROM 12, the RAM 13, and the I/O 14 are included in a control unit. The control unit may be configured as a sub control unit that controls a partial operation of the image forming device 10, or may be configured as a part of a main control unit that controls the entire operation of the image forming device 10. For some or all of the blocks of the control unit, for example, an integrated circuit such as a large scale integration (LSI) or an integrated circuit (IC) chip set is used. An individual circuit may be used for each of the blocks, or a circuit in which some or all of the blocks are integrated may be used. The respective blocks may be provided integrally with each other, or some of the blocks may be provided separately. Some of the respective blocks may be provided separately. The integration of the control unit is not limited to the LSI, and a dedicated circuit or a general-purpose processor may be used.

For example, a hard disk drive (HDD), a solid state drive (SSD), a flash memory, or the like is used as the storage unit 15. The storage unit 15 stores an information processing program 15A according to the present embodiment. The information processing program 15A may be stored in the ROM 12.

The information processing program 15A may be installed in the image forming device 10 in advance, for example. The information processing program 15A may be implemented by being stored in a nonvolatile storage medium or distributed via a network, and installed in the image forming device 10, if appropriate. Examples of the nonvolatile storage medium include a compact disc read only memory (CD-ROM), a magneto-optical disk, an HDD, a digital versatile disc read only memory (DVD-ROM), a flash memory, and a memory card.

For example, a liquid crystal display (LCD), an organic electro luminescence (EL) display, or the like is used as the display unit 16. The display unit 16 integrally includes a touch panel, and receives various input operations from the user via the touch panel. For example, a capacitive method may be employed for the touch panel. A method other than the capacitive method may be employed for the touch panel. In addition, the reporting unit 17 outputs a preset sound effect, vibration, and the like according to various input operations.

The document reading unit 18 takes in, one by one, documents placed on a feeding tray of an automatic document feeder (not shown) provided at an upper portion of the image forming device 10 and optically reads the taken-in document to obtain image information. Alternatively, the document reading unit 18 optically reads a document placed on a document platen such as a platen glass to obtain image information.

The image forming unit 19 forms, on a recording medium such as paper, an image based on image information obtained by reading performed by the document reading unit 18 or image information obtained from an external personal computer (PC) or the like connected via the network. An electrophotographic method is described as an example of a method of forming an image in the present embodiment, but other methods such as an inkjet method may be adopted.

In a case in which the method of forming an image is the electrophotographic method, the image forming unit 19 includes a photosensitive drum, a charging unit, an exposure unit, a developing unit, a transfer unit, and a fixing unit. The charging unit applies a voltage to the photosensitive drum to charge the surface of the photosensitive drum. The exposure unit forms an electrostatic latent image on the photosensitive drum by exposing the photosensitive drum charged by the charging unit with light corresponding to image information. The developing unit forms a toner image on the photosensitive drum by developing the electrostatic latent image formed on the photosensitive drum with toner. The transfer unit transfers the toner image formed on the photosensitive drum to a recording medium. The fixing unit fixes the toner image transferred onto the recording medium by heating and pressing.

The communication unit 20 is connected to a network such as the Internet, a local area network (LAN), or a wide area network (WAN), and can communicate with an external PC or the like via the network.

Figure 2:
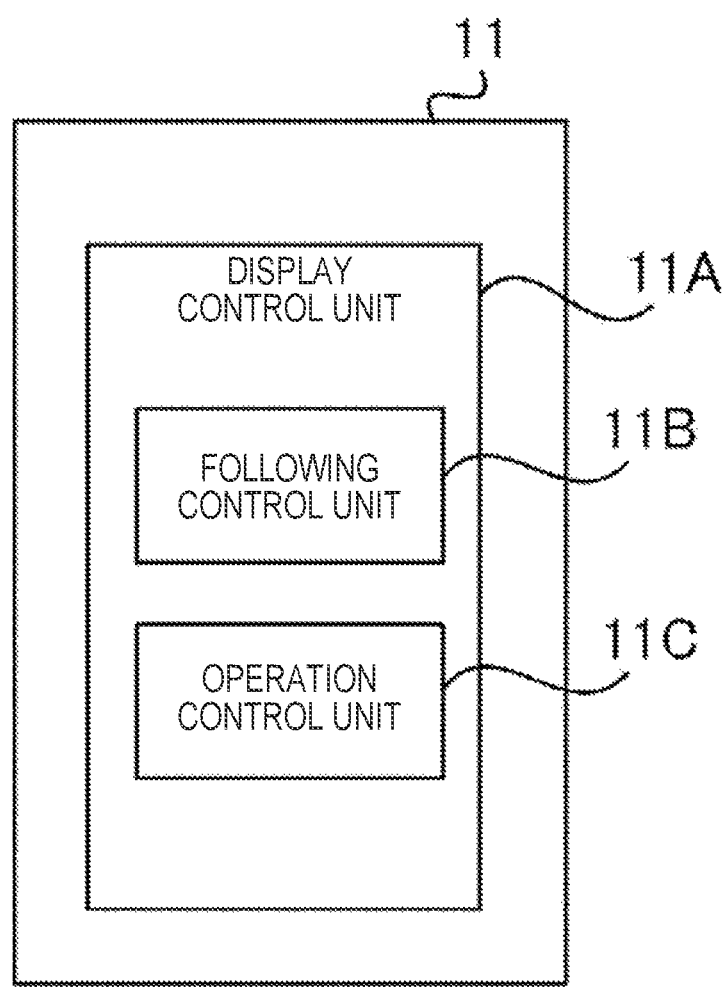
FIG. 2 is a block diagram showing an example of a functional configuration of the image forming device according to the first embodiment.

The CPU 11 of the image forming device 10 according to the present embodiment functions as each unit shown in FIG. 2 by writing in the RAM 13 and executing the information processing program 15A stored in the storage unit 15.

FIG. 2 is a block diagram showing an example of a functional configuration of the image forming device 10 according to the first embodiment.

As shown in FIG. 2, the CPU 11 of the image forming device 10 according to the present embodiment functions as a display control unit 11A. The display control unit 11A includes a following control unit 11B and an operation control unit 11C.

The display control unit 11A has a control function of controlling display of an image on the display unit 16 and a control function of controlling execution of a function and non-execution of a function according to a display position of an operation part displayed as an image on the display unit 16.

The following control unit 11B performs control to display an image on the display unit 16 and control to display the operation part displayed as an image in such a way as to follow a movement operation by the user. That is, when the user performs the movement operation on the operation part while the operation part is displayed on the display unit 16, the following control unit 11B displays the operation part at a position following the movement operation on the display unit 16.

When the movement operation is completed for the operation part displayed in such a way as to follow the movement operation by the user, the operation control unit 11C controls execution of the function or non-execution of the function according to the position of the operation part. The non-execution of the function is control for maintaining a state (for example, an initial state) in which execution of the function is not started by a movement operation that does not lead to execution of the function. The control of the execution of the function includes control for executing a predetermined function.

Next, execution of the functions by the CPU 11 of the image forming device 10 according to the present embodiment will be described. In the following description, execution of copying of a document will be described as an example of the execution of a function by the CPU 11. The execution of a function is not limited to the execution of copying of a document, and may be other processing executed in the image forming device 10.

Figure 3:
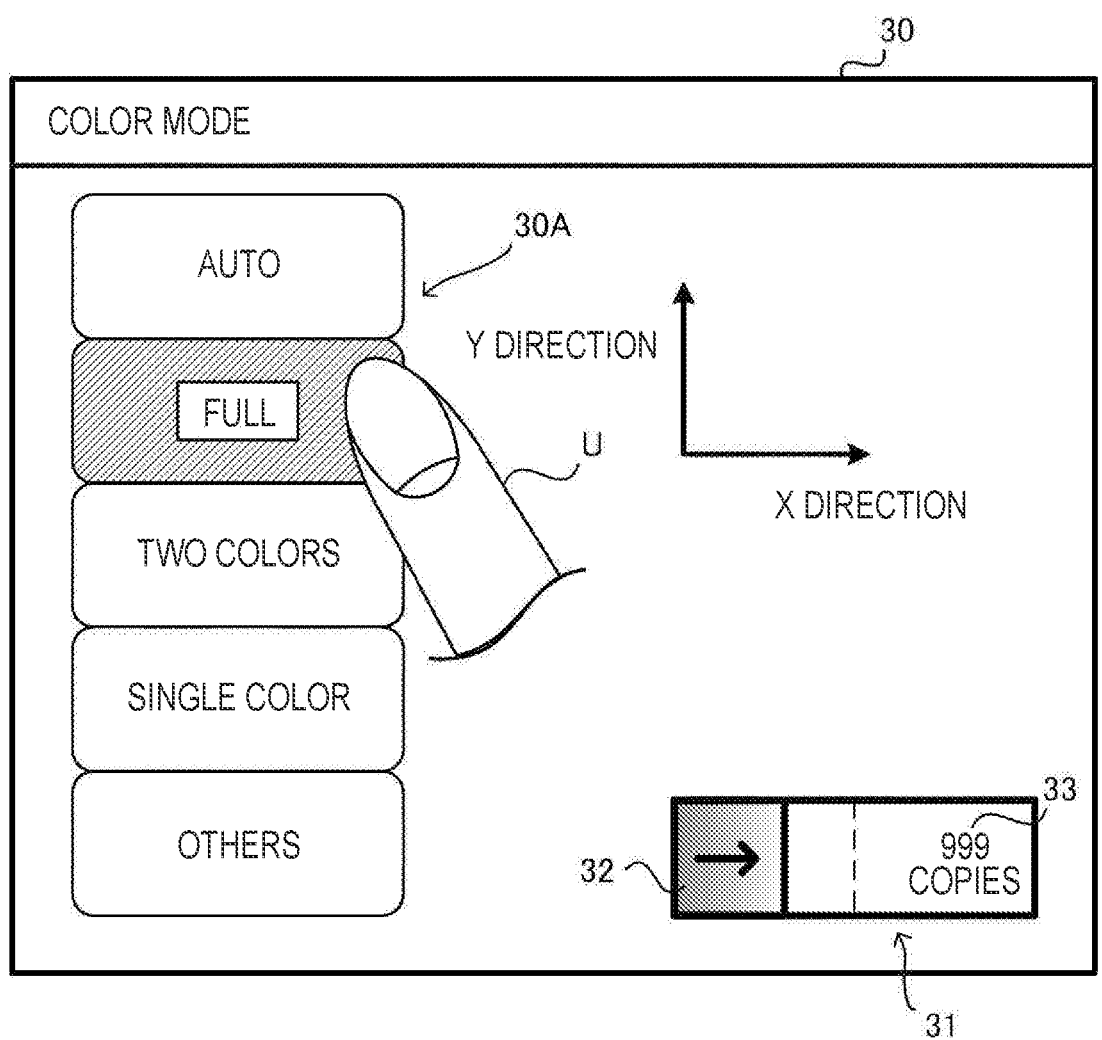
FIG. 3 is a view showing an example of a screen displayed on a display unit by processing in a central processing unit (CPU).

FIG. 3 is a view showing an example of a screen 30 displayed on the display unit 16 by processing in the CPU 11.

FIG. 3 shows an example of a setting screen for performing color-related setting at the time of copying a document by exemplifying a copying condition in an image copying function among document-related functions executed by the CPU 11. Further, in the following description, a horizontally rightward direction of a screen in a state in which the user views the screen is referred to as an X direction, and a vertically upward direction is referred to as a Y direction.

In the example of the screen 30, a selection instruction button 30A for issuing an instruction for setting of the copying condition regarding a color in a case in which a document is copied is displayed. The copying condition is a setting for a function of the image forming device 10 that can be set in the case of copying a copying target (for example, a document), and the function is set as a parameter. In the example shown in FIG. 3, selection instruction buttons for issuing an instruction for color-related setting of any one of "auto", "full", "two colors", "single color", and "others" are displayed. The "auto" button as the selection instruction button is a button for automatically detecting a color of a document and issuing an instruction for selection of copying in the color of the document. The "full" button is a button for selecting and issuing an instruction for copying of a document in multiple colors supported by the image forming device 10. The "two colors" button is a button for selecting and issuing an instruction for copying in two predetermined colors. The "single color" button is a button for selecting and issuing an instruction for copying in a single predetermined color. The "others" button is a button for selecting and issuing an instruction for copying by setting other colors. Since the parameter of the copying condition is a known technology, a description thereof will be omitted.

FIG. 3 shows a screen in which the "full" button is highlighted when the "full" button is pressed by a user operation, as a state in which an instruction for the setting of the copying condition is issued.

In addition, in a case in which the instruction for the copying condition is issued, an image is displayed on an instruction portion 31 for issuing an instruction to execute copying on the screen 30 shown in FIG. 3. The instruction portion 31 includes a slide mark 32 indicating a movable image for issuing an instruction to execute copying, and a display area 33 for displaying the number of copies among the copying conditions. Although not shown here, the instruction portion 31 may include a message area for displaying a description of an operation method. In the message area, for example, a "slide to start" message indicating that copying is executed (that is, started) by moving (that is, sliding) the slide mark 32 is displayed. The slide mark 32 can also be displayed at a position moved in the X direction (and the opposite direction). The slide mark 32 is an example of the operation part.

In the example of FIG. 3, when the slide mark 32 is touched by a finger of a user U, the color of the slide mark 32 changes, and the movement operation such as dragging or sliding becomes possible. Information depending on the function (for example, a copying function, a printing function, a facsimile function, a scanner function, or the like) of the image forming device 10, such as the number of copies and the number of transmissions, is displayed in the display area 33.

Figure 4:
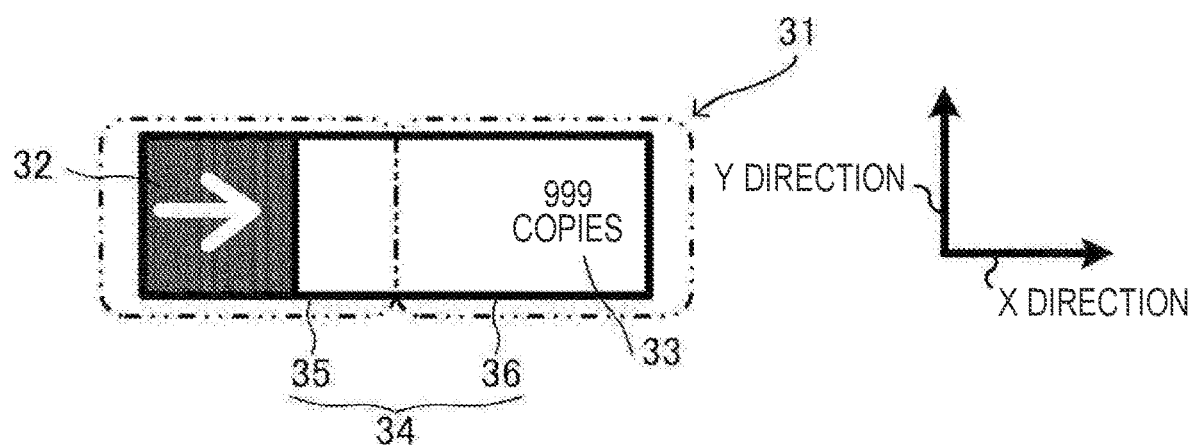
FIG. 4 is a view showing an example of a movable area determined in advance for an instruction portion.

FIG. 4 is a view showing an example of a movable area 34 determined in advance for the instruction portion 31.

The instruction portion 31 includes the movable area 34 which is an area in which the slide mark 32 is movable. The movable area 34 is an example of an area for determining non-execution of copying and execution of copying according to a position of the slide mark 32 displayed in a movable manner. The movable area 34 includes a start area 35 and an execution area 36. The start area 35 is an area that does not cause the predetermined function to be executed, and the execution area 36 is an area that causes the predetermined function to be executed. The predetermined function here is, for example, the above-described image copying function.

Specifically, the execution area 36 is an area for specifying that copying is executed in a case in which the slide mark 32 is present in the area when the movement operation is completed. In addition, the start area 35 is an area for specifying that copying is not executed (non-execution) in a case in which the slide mark 32 is present in the area when the movement operation is completed.

Figure 5:
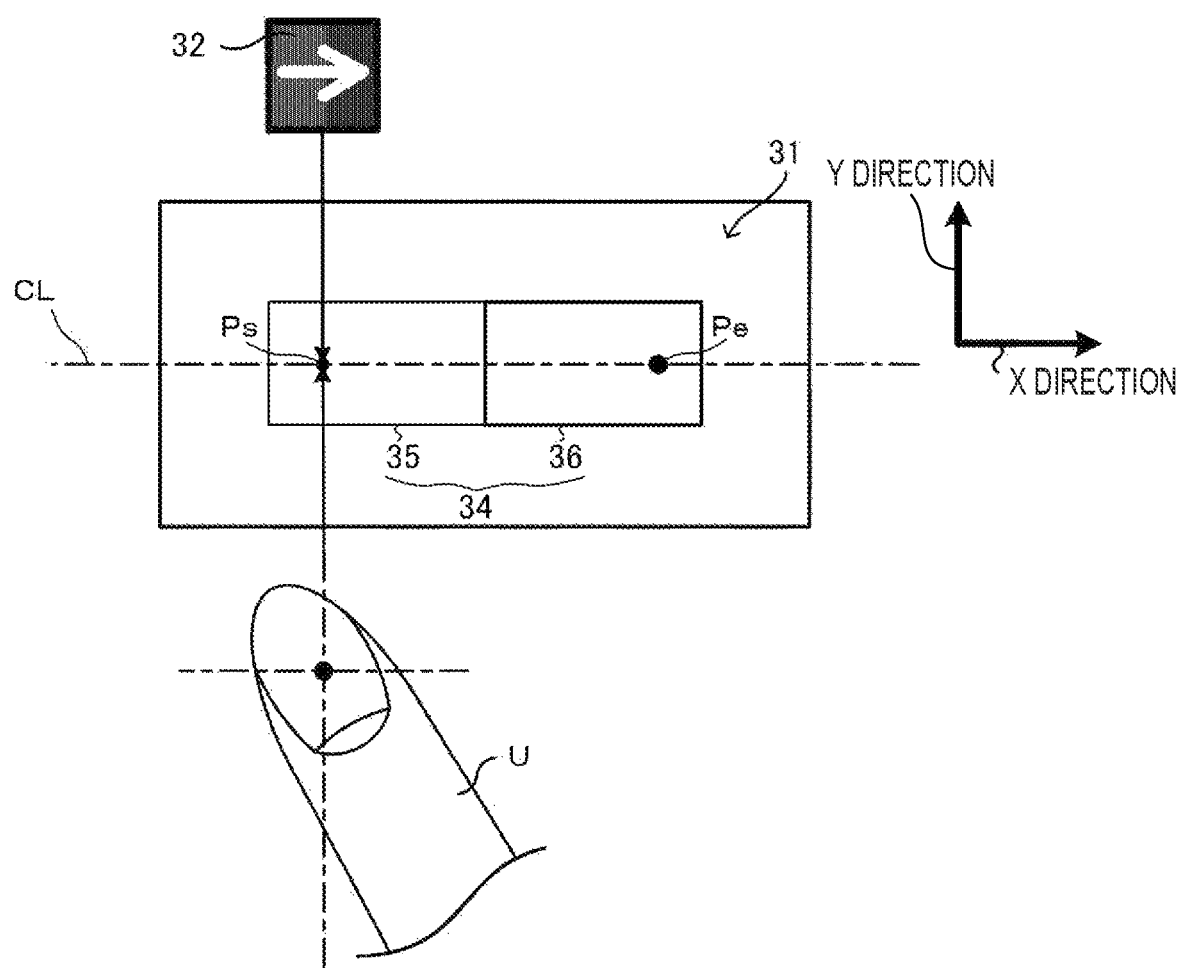
FIG. 5 is a schematic diagram showing an example of a relationship between a user operation and a position of a slide mark with respect to the user operation in the instruction portion displayed on the display unit.

FIG. 5 is a schematic diagram showing an example of a relationship between a user operation and a position of the slide mark 32 with respect to the user operation in the instruction portion 31 displayed on the display unit 16.

The user U issues an instruction to execute copying by bringing the finger of the user U into contact with the slide mark 32 displayed on the instruction portion 31 of the display unit 16 while bringing the finger of the user U into contact with the slide mark 32. The slide mark 32 is moved within a range of the start area 35 and the execution area 36 in the X direction on a line CL connecting the center positions of the start area 35 and the execution area 36 in the Y direction. More specifically, an initial position Ps as a start point and an execution position Pe as an end point are determined in advance in the slide mark 32, and the slide mark 32 can be displayed between the initial position Ps and the execution position Pe.

That is, movement of the finger of the user U is a two-dimensional movement in the X direction and the Y direction. That is, the finger of the user U may also move in an oblique direction. On the other hand, the slide mark 32 is moved only in the movable area 34 according to the movement operation by the user U, and the movement direction of the slide mark 32 is limited to the X direction (or the opposite direction). The movement of the slide mark 32 is one-dimensional movement. In a case in which a locus of the movement operation by the user U reaches the outside of the instruction portion 31, the slide mark 32 is moved inside the movable area 34 following the movement operation by the user U. That is, the position of the finger of the user U and the position of the slide mark 32 are in a projective relationship.

For example, in a case in which the center of the slide mark 32 in the X direction is positioned in the start area 35, it is determined that the slide mark 32 is positioned in the start area 35, and in a case in which the center of the slide mark 32 in the X direction is positioned in the execution area 36, it is determined that the slide mark 32 is positioned in the execution area 36. A boundary between the start area 35 and the execution area 36 can be set by the user, if appropriate.

In the examples of FIGS. 3 to 5, the instruction portion 31 is arranged sideways, but a disposition direction of the instruction portion 31 is not limited thereto. For example, the instruction portion 31 may be arranged vertically. In this case, the movement direction of the slide mark 32 is limited to the Y direction (or the opposite direction).

Returning to FIG. 2, as an example, the following control unit 11B detects an operation position (for example, coordinates) touched by the finger of the user U on the screen 30 shown in FIG. 3 described above. A stylus pen or the like may be used instead of the finger of the user U. As described above, the movement operation here is, for example, an operation such as dragging or sliding. The locus of the movement operation is derived from a plurality of positions continuously detected by the movement operation. In addition, in a case in which the contact of the slide mark 32 by the finger of the user U is detected, the following control unit 11B derives the position of the slide mark 32 to follow the movement operation by the finger of the user U. Specifically, in a case in which the movement operation is performed on the slide mark 32 by the finger of the user U, the following control unit 11B moves the slide mark 32 in such a way as to follow the movement operation in the movable area 34.

The operation control unit 11C controls the predetermined function (hereinafter, referred to as the "image copying function" as an example) based on the operation position touched by the finger of the user U and the position of the slide mark 32. Specifically, the operation control unit 11C executes the image copying function in a case in which the movement operation is completed after the slide mark 32 is moved from the start area 35 to the execution area 36 by the movement operation by the finger of the user U.

Next, the movement operation according to the present embodiment will be specifically described with reference to FIG. 6.

Figure 6:
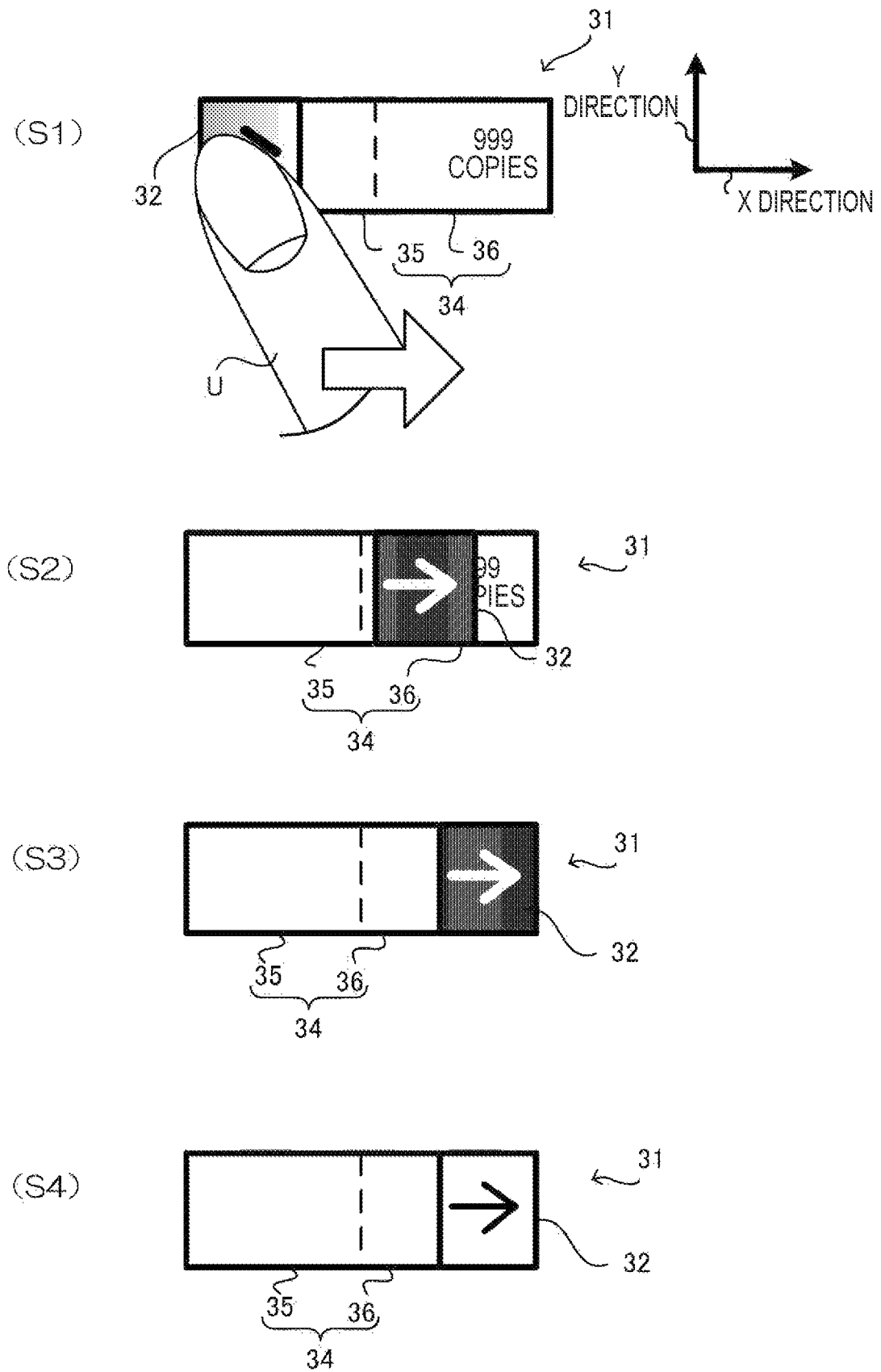
FIG. 6 is a view for describing a movement operation according to an embodiment.

FIG. 6 is a view for describing the movement operation according to the present embodiment.

In (S1), when the slide mark 32 is touched by the finger of the user U, the CPU 11 detects the position of the slide mark 32 and changes the color of the slide mark 32 to a color indicating an execution reservation for the function. Then, the slide mark 32 is moved in an arrow direction (X direction) following the movement operation by the user U. In an initial state, the slide mark 32 is positioned at a start end (here, the left end) of the start area 35. In addition, in a case in which the finger of the user U is released in a state in which the slide mark 32 is separated from the start end and is positioned in the start area 35, it is determined that the movement operation is completed, and the slide mark 32 is returned to the start end, that is, the slide mark 32 is attracted to the start end, and the image copying function is not executed.

In (S2), in a case in which the CPU 11 further moves the slide mark 32 in the X direction following the movement operation by the user U, it is detected that the slide mark 32 has passed the start area 35 and reached the inside of the execution area 36. At this time, a text (for example, 999 copies) of a portion through which the slide mark 32 passes is hidden.

In (S3), in a case in which the CPU 11 further moves the slide mark 32 in the X direction following the movement operation by the user U, it is detected that the slide mark 32 has reached a termination end (here, the right end) of the execution area 36. Here, when the finger of the user U is released, it is determined that the movement operation is completed. In a case in which the finger of the user U is released in a state in which the slide mark 32 is positioned in the execution area 36 and has not reached the termination end, it is determined that the movement operation is completed, and the slide mark 32 is moved to the termination end, that is, the slide mark 32 is attracted to the termination end, as described above. However, it may be determined that the movement operation is completed only in a case in which the finger of the user U is released in a state in which the slide mark 32 has reached the termination end.

In (S4), the CPU 11 executes the image copying function, and changes the color of the slide mark 32 moved to the termination end of the execution area 36 to a color indicating the execution of the function. The execution of the image copying function is started when the slide mark 32 is moved to the termination end of the execution area 36.

As shown in FIG. 6, in a case in which the user U performs the movement operation on the slide mark 32 in the instruction portion 31, and the movement operation is completed after the slide mark 32 passes the start area 35 and is moved to the inside of the execution area 36, the image copying function is executed as an example.

By the way, in a case in which the user performs an operation on the operation part, it is desirable from the viewpoint of preventing an erroneous operation that the user can grasp the degree of importance of the function executed by the operation.

Therefore, the image forming device 10 according to the present embodiment includes the operation control unit 11C shown in FIG. 2 described above.

The operation control unit 11C performs control to change a reporting mode related to the movement operation in such a way that, as the degree of importance determined by the execution condition for the predetermined function (for example, the image copying function) becomes relatively higher, the degree of highlighting of the reporting mode related to the movement operation increases according to the position of the slide mark 32 during the movement operation on the slide mark 32 by the user. The change in reporting mode according to the present embodiment includes changing a display mode of at least one of the slide mark 32 or the movable area 34. In this case, the degree of highlighting of the display mode of at least one of the slide mark 32 or the movable area 34 is expressed as, for example, the degree of change in color of at least one of the slide mark 32 or the movable area 34. That is, the operation control unit 11C according to the present embodiment performs control to change the color of at least one of the slide mark 32 or the movable area 34 in such a way that the degree of change in color of at least one of the slide mark 32 or the movable area 34 increases according to the position of the slide mark 32 as the degree of importance becomes relatively higher.

Figure 7:
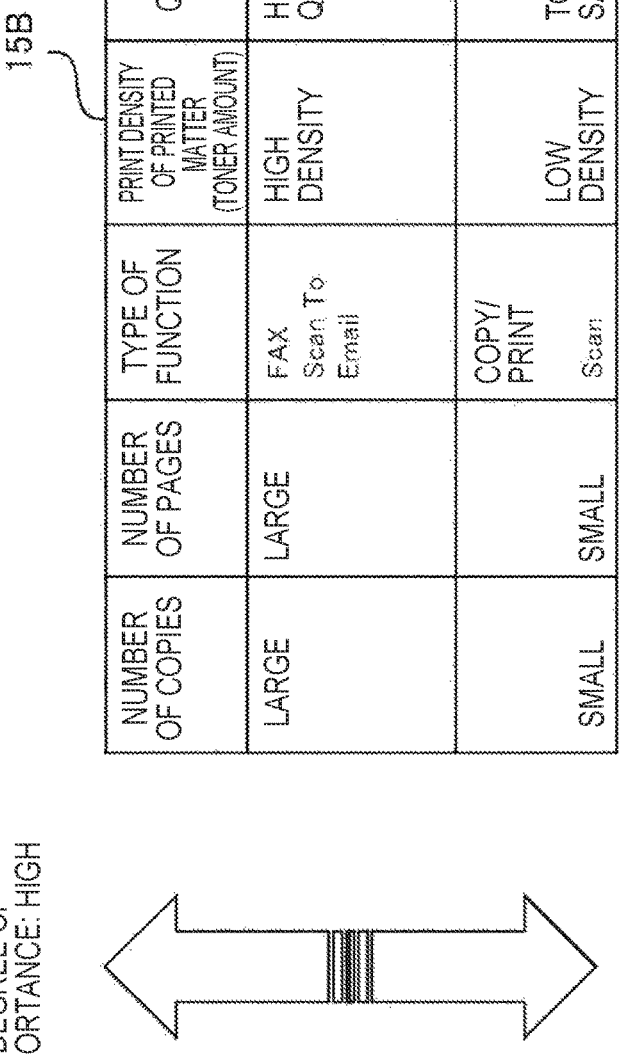
FIG. 7 is a diagram showing an example of an importance degree table according to an embodiment.

FIG. 7 is a diagram showing an example of an importance degree table 15B according to the present embodiment.

The importance degree table 15B shown in FIG. 7 is stored in the storage unit 15, for example. The "degree of importance" described herein indicates a level determined by an execution condition for a function. The execution condition represents various conditions designated in the case of executing a function, such as a type of the function, a setting value of a setting item for each function, and the like. As shown in FIG. 7, examples of the execution conditions include the number of copies, the number of pages, the type of the function, a print density (toner amount) of printed matter, an image quality, a paper type, security of a destination, a color mode, and the like.

As an example, as shown in FIG. 7, the degree of importance is relatively high in a case in which the number of copies is large, and is relatively low in a case in which the number of copies is small. Whether the number of copies is large or small is determined using, for example, a preset threshold. In addition, the degree of importance is relatively high in a case in which the number of pages is large, and is relatively low in a case in which the number of pages is small. Whether the number of pages is large or small is determined using, for example, a preset threshold.

In addition, the degree of importance is relatively high in a case in which the type of the function is FAX (facsimile) or Scan To Email (scanning a document and sending the document by e-mail), and is relatively low in a case in which the type of the function is Copy/Print or Scan. In addition, the degree of importance is relatively high in a case in which the print density of the printed matter is high (the toner amount is large), and is relatively low in a case in which the print density of the printed matter is low. Whether the print density of the printed matter is high or low is determined using, for example, a preset threshold. In addition, the degree of importance is relatively high in a case in which the image quality is high, and is relatively low in a case in which the image quality is low as in a toner saving mode. For example, a resolution expressed in dots per inch (dpi) is used as an index of the image quality. Whether the image quality is high or low is determined using, for example, a preset threshold.

In addition, the degree of importance is relatively high in a case in which the paper type is an overhead projector (OHP) sheet, label paper, or coated paper, and is relatively low in a case in which the paper type is plain paper or recycled paper. In addition, the degree of importance is relatively high in a case in which high security is required for a destination, and is relatively low in a case in which high security is not required for the destination. For example, the degree of importance is high in a case in which the destination is a customer requiring high confidentiality (that is, a customer handling highly confidential cases), and the degree of importance is low in a case in which the destination is inside the company. Further, the degree of importance is relatively high in a case in which the color mode is color, and is relatively low in a case in which the color mode is monochrome.

The degree of importance may be expressed in two stages (binary values) of "high" and "low", or may be expressed in three or more stages. For example, in a case in which the upper limit of the number of copies is set to 999 copies, the degree of importance is set to "low" in a case in which the number of copies is one or more but less than 500, and the degree of importance is set to "high" in a case in which the number of copies is from 500 to 999. Alternatively, the degree of importance may be set to "low" in a case in which the number of copies is one or more but less than 99, the degree of importance may be set to "medium" in a case in which the number of copies is 99 or more but less than 500, and the degree of importance may be set to "high" in a case in which the number of copies is from 500 to 999. Setting criteria, thresholds, combinations, and the like for the degree of importance can be set by the user, if appropriate.

Next, the operation of the image forming device 10 according to the first embodiment will be described with reference to FIG. 8.

Figure 8:
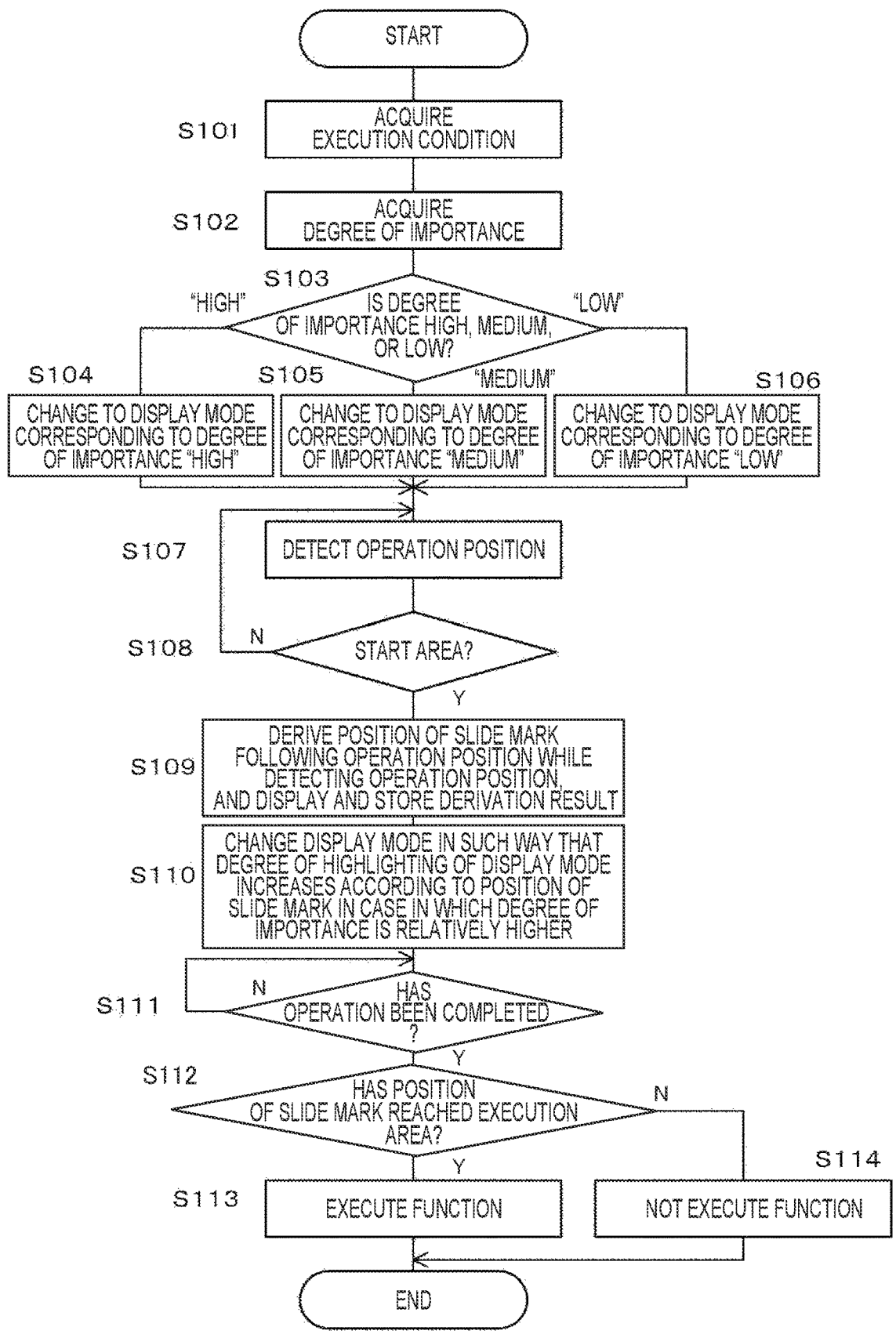
FIG. 8 is a flowchart showing an example of a flow of processing executed by an information processing program according to the first embodiment.

FIG. 8 is a flowchart showing an example of a flow of processing executed by the information processing program 15A according to the first embodiment.

First, as an example, when an instruction to display the screen 30 shown in FIG. 3 is issued to the image forming device 10, the information processing program 15A is started and executes the following steps.

In step S101 of FIG. 8, as an example, the CPU 11 acquires an execution condition (for example, the color mode) designated by the user U via the screen 30 shown in FIG. 3 described above. The acquired execution condition is not limited to the color mode, and may be, for example, the number of copies, the number of pages, the image quality, or the like, as described above.

In step S102, the CPU 11 acquires the degree of importance determined by the execution condition by referring to the importance degree table 15B shown in FIG. 7 described above as an example based on the execution condition acquired in step S101.

In step S103, the CPU 11 determines whether the degree of importance acquired in step S102 is "high", "medium", or "low". In a case in which it is determined that the degree of importance is "high" (in the case of "high"), the processing proceeds to step S104. In a case in which it is determined that the degree of importance is "medium" (in the case of "medium"), the processing proceeds to step S105. In a case in which the degree of importance is "low" (in the case of "low"), the processing proceeds to step S106. In this example, the degree of importance is set to three levels of "high", "medium", and "low", and may also be set to two levels of "high" and "low", or four or more levels.

In step S104, the CPU 11 performs control to change the display mode (for example, the color) of at least one of the slide mark 32 or the movable area 34, corresponding to the degree of importance "high".

In step S105, the CPU 11 performs control to change the display mode (for example, the color) of at least one of the slide mark 32 or the movable area 34, corresponding to the degree of importance "middle".

In step S106, the CPU 11 performs control to change the display mode (for example, the color) of at least one of the slide mark 32 or the movable area 34, corresponding to the degree of importance "low".

In step S107, as an example, the CPU 11 detects an operation position touched by the finger of the user U on the screen 30 shown in FIG. 3 described above.

In step S108, the CPU 11 determines whether or not the operation position detected in step S107 is within the start area 35. In a case in which it is determined that the operation position is within the start area 35 (in the case of affirmative determination), the processing proceeds to step S109, and in a case in which it is determined that the operation position is not within the start area 35 (in the case of negative determination), the processing returns to step S107 and stands by.

In step S109, the CPU 11 derives the position of the slide mark 32 following the operation position while detecting the operation position touched by the finger of the user U, and displays and stores the derivation result.

In step S110, the CPU 11 performs control to change the display mode in such a way that the degree of highlighting (for example, the degree of color change) of the display mode increases according to the position of the slide mark 32 as the degree of importance becomes relatively higher. Specifically, in a case in which the degree of importance is "high", a color tone (for example, shading, brightness, intensity, or the like) is greatly changed only by slightly moving the slide mark 32. For example, the color is changed from pink to red. On the other hand, in a case in which the degree of importance is "low", even when the slide mark 32 is greatly moved, the color tone is hardly changed, or the color tone is not changed at all. A specific example of the relationship between the degree of importance, a position of the slide mark 32, and a change in a display mode (for example, color) in step S110 will be described below.

In step S111, the CPU 11 determines whether or not the movement operation by the user U has been completed. The completion of the movement operation is determined when the finger of the user U is released from the slide mark 32 (a following relationship between the finger of the user U and the slide mark 32 is released). In a case in which it is determined that the movement operation has been completed (in the case of affirmative determination), the processing proceeds to step S112, and in a case in which it is determined that the movement operation has not been completed (in the case of negative determination), the processing stand by in step S111.

In step S112, the CPU 11 determines whether or not the position of the slide mark 32 when the movement operation by the user U has been completed in step S111 has reached the execution area 36. In a case in which it is determined that the position of the slide mark 32 has reached the execution area 36 (in the case of affirmative determination), the processing proceeds to step S113, and in a case in which it is determined that the position of the slide mark 32 has not reached the execution area 36 (in the case of negative determination), the processing proceeds to step S114.

In step S113, the CPU 11 executes the image copying function as an example of the predetermined function, and ends a series of processing by the information processing program 15A.

In step S114, the CPU 11 ends a series of processing by the information processing program 15A without executing the image copying function as an example of the predetermined function.

Next, the relationship between the degree of importance, a position of the slide mark 32, and a change in a display mode will be specifically described with reference to FIGS. 9 and 10.

Figure 9:
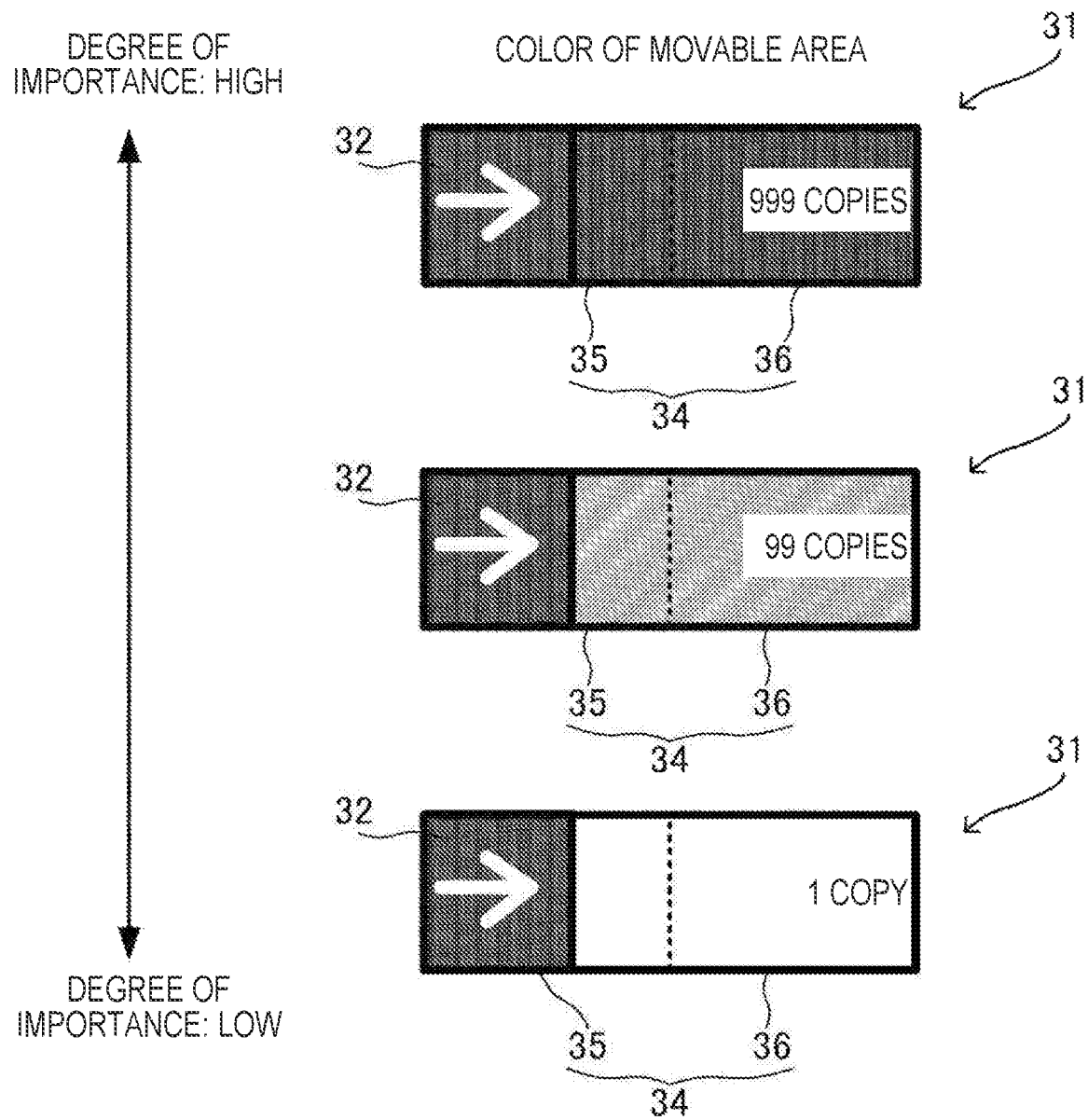
FIG. 9 is a diagram showing an example of a relationship between the degree of importance and a change in a display mode according to the first embodiment.

FIG. 9 is a diagram showing an example of a relationship between the degree of importance and a change in a display mode according to the first embodiment. In the example of FIG. 9, the slide mark 32 is positioned at the start end.

As shown in FIG. 9, the CPU 11 performs control to change the color of the movable area 34 to a more noticeable color as the degree of importance becomes relatively higher. For example, the color of the movable area 34 is changed to "red" in a case in which the degree of importance is "high", the color of the movable area 34 is changed to "brown" in a case in which the degree of importance is "medium", and the color of the movable area 34 is changed to "skin color" in a case in which the degree of importance is "low". In the example of FIG. 9, the difference in color is represented by a difference in hatching. The present disclosure is not limited to changing only the color of the movable area 34. Only the color of the slide mark 32 may be changed, or both the color of the movable area 34 and the color of the slide mark 32 may be changed. The change in a display mode is not limited to the change in color. For example, the higher the degree of importance, the thicker the characters (for example, 1 copy, 99 copies, and 999 copies) may be, or the larger the size of the characters (for example, 1 copy, 99 copies, and 999 copies) may be.

Figure 10:
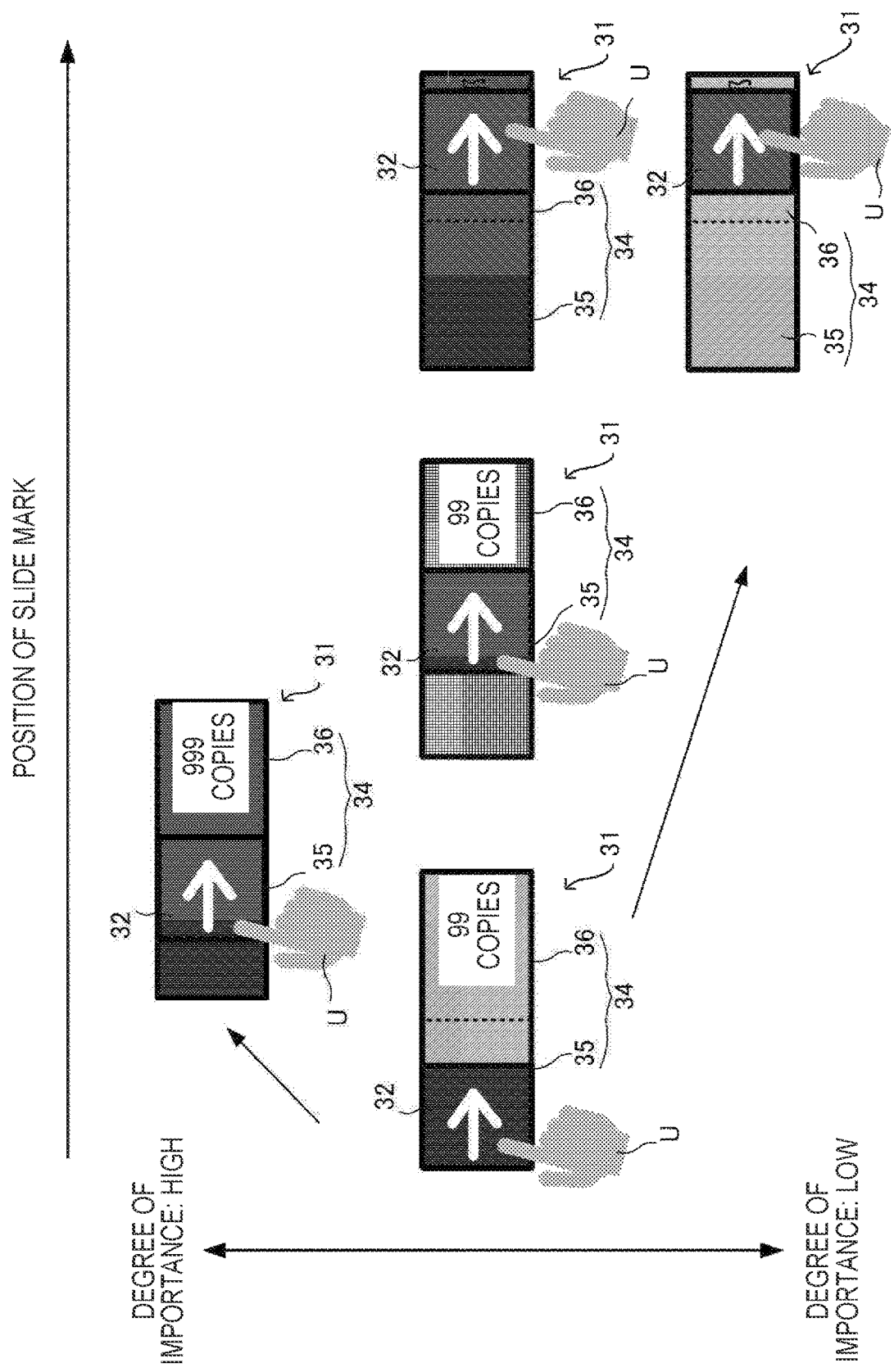
FIG. 10 is a diagram showing an example of a relationship between the degree of importance, a position of the slide mark, and a change in a display mode according to the first embodiment.

FIG. 10 is a diagram showing an example of the relationship between the degree of importance, a position of the slide mark 32, and a change in a display mode according to the first embodiment.

As shown in FIG. 10, the CPU 11 performs control to change the color of at least one of the slide mark 32 or the movable area 34 in such a way that the degree of change in color of at least one of the slide mark 32 or the movable area 34 increases according to the position of the slide mark 32 as the degree of importance becomes relatively higher. Specifically, in a case in which the degree of importance is "high", a color tone (for example, shading, brightness, intensity, or the like) is greatly changed only by slightly moving the slide mark 32. For example, the color is changed from pink to red. In a case in which the degree of importance is "medium", the color tone is changed to some extent when the slide mark 32 is moved to the vicinity of the center, and the color tone is further changed when the slide mark 32 is moved to the vicinity of the termination end. For example, the color is sequentially changed to light brown, brown, and dark brown. Further, in a case in which the degree of importance is "low", even when the slide mark 32 is greatly moved, the color tone is hardly changed, or the color tone is not changed at all. The color of the movable area 34 in the initial state (a state in which the slide mark 32 is at the left end) for each of the degree of importance "high", the degree of importance "medium", and the degree of importance "low" may be different as shown in FIG. 9 described above, or may be the same color.

Here, the CPU 11 may perform control to change the color of at least one of the slide mark 32 or the movable area 34 according to the type of the predetermined function when the finger of the user U comes into contact with the slide mark 32. Specifically, as an example, in a case in which the type of the function to be executed is a function whose degree of importance is relatively high, such as "FAX" or "Scan To Email" as shown in FIG. 7 described above, it is desirable to change the color of at least one of the slide mark 32 or the movable area 34. This makes it possible to notify the user that the function is important without moving the slide mark 32.

In addition, the CPU 11 may perform control to change the color of at least one of the slide mark 32 or the movable area 34 in a case in which the slide mark 32 is moved into the execution area 36. That is, the corresponding function is executed when the user completes the movement operation on the slide mark 32 (the user releases the finger) at a time point at which the color of at least one of the slide mark 32 or the movable area 34 is changed. The position where the movement operation on the slide mark 32 is completed (the finger is released) is grasped by changing the color of at least one of the slide mark 32 or the movable area 34.

As described above, according to the present embodiment, the display mode is changed in such a way that the degree of highlighting of the display mode of at least one of the operation part or the movable area increases according to the position of the operation part as the degree of importance determined by the execution condition for the function executed by the movement operation becomes relatively higher during the movement operation on the operation part by the user. Therefore, the user can grasp that the executed function executed is important during the movement operation.

Second Embodiment

In the first embodiment described above, changing the display mode of at least one of the operation part or the movable area has been described as an example of the change in a reporting mode related to the movement operation. In a second embodiment, changing an output mode of at least one of sound or vibration from a reporting unit will be described as another example of the change in a reporting mode related to the movement operation.

Since components included in an image forming device according to the present embodiment are the same as the components included in the image forming device 10 shown in FIGS. 1 and 2 described above, an overlapping description thereof will be omitted here.

The change in a reporting mode according to the present embodiment includes changing an output mode of at least one of sound or vibration from a reporting unit 17. In this case, a CPU 11 as an operation control unit 11C performs control to change the output mode of at least one of the sound or the vibration from the reporting unit 17 in such a way that the degree of highlighting of the output mode of at least one of the sound or the vibration from the reporting unit 17 increases according to a position of a slide mark 32 as the degree of importance determined by an execution condition for a predetermined function becomes relatively higher.

The degree of highlighting of the output mode of at least one of the sound or the vibration from the reporting unit 17 is expressed as, for example, the degree of change in output intensity, output pattern, or output time of at least one of the sound or the vibration from the reporting unit 17. The output intensity is a concept including a magnitude.

Next, a relationship between the degree of importance, a position of the slide mark 32, and a change in the output mode will be specifically described with reference to FIGS. 11 to 13.

Figure 11:
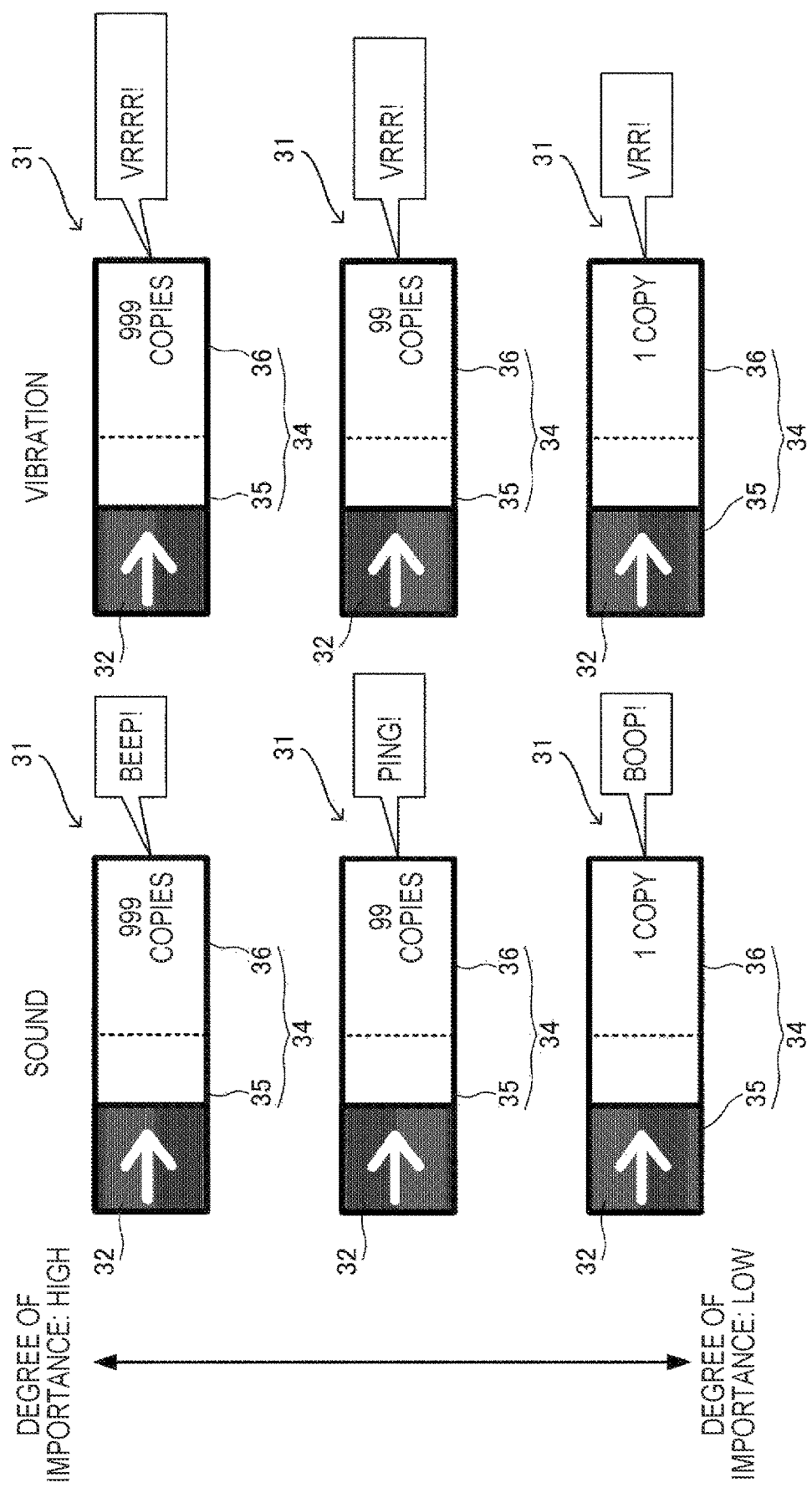
FIG. 11 is a diagram showing an example of a relationship between the degree of importance and a change in an output mode according to a second embodiment.

FIG. 11 is a diagram showing an example of the relationship between the degree of importance and a change in the output mode according to the second embodiment. In the example of FIG. 11, the slide mark 32 is positioned at the start end.

As shown in FIG. 11, the CPU 11 performs control to change the sound output from the reporting unit 17 to a larger sound (a sound with a higher output intensity) as the degree of importance becomes relatively higher. For example, the sound output from the reporting unit 17 is changed to "beep!" in a case in which the degree of importance is "high", the sound output from the reporting unit 17 is changed to "ping!" in a case in which the degree of importance is "medium", and the sound output from the reporting unit 17 is changed to "boop!" in a case in which the degree of importance is "low". The present disclosure is not limited to the change in output intensity, and the output pattern and the output time of the sound output from the reporting unit 17 may be changed in such a way that the degree of highlighting increases as the degree of importance becomes relatively higher. In the case of the output pattern, for example, complexity of the output pattern may increase, and in the case of the output time, for example, the output time may increase.

In addition, as shown in FIG. 11, the CPU 11 performs control to change the vibration output from the reporting unit 17 to a larger vibration (a vibration with a larger output intensity) as the degree of importance becomes relatively higher. For example, the vibration output from the reporting unit 17 is changed to "vrrrr!" in a case in which the degree of importance is "high", the vibration output from the reporting unit 17 is changed to "vrrr!" in a case in which the degree of importance is "medium", and the vibration output from the reporting unit 17 is changed to "vrr!" in a case in which the degree of importance is "low". Similarly to the case of the sound described above, the present disclosure is not limited to the change in output intensity, and the output pattern and the output time of the vibration output from the reporting unit 17 may be changed in such a way that the degree of highlighting increases as the degree of importance becomes relatively higher. In the case of the output pattern, for example, complexity of the output pattern may increase, and in the case of the output time, for example, the output time may increase. A configuration in which both the sound and the vibration are changed may also be adopted.

Figure 12:
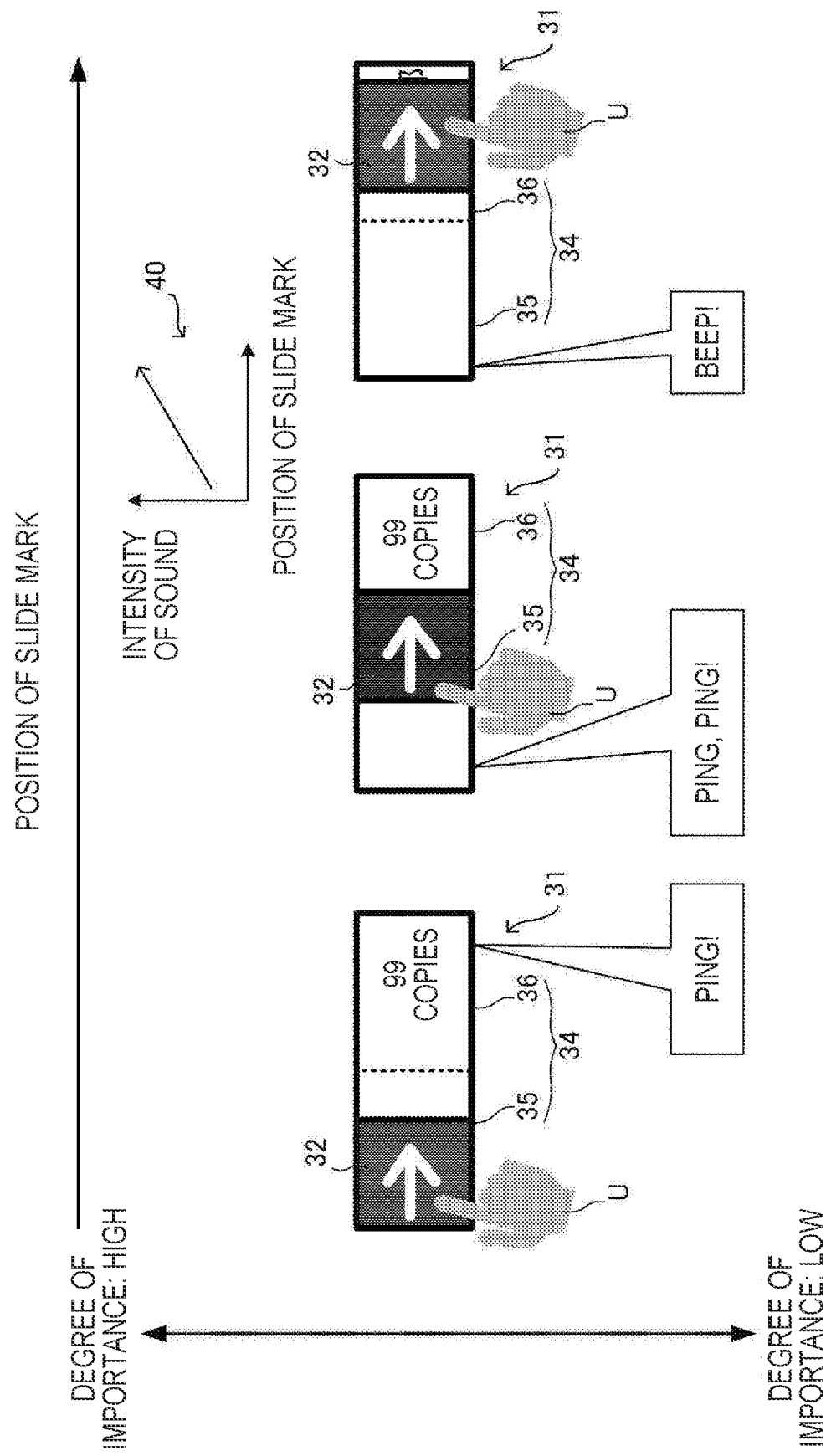
FIG. 12 is a diagram showing an example of a relationship between the degree of importance, a position of a slide mark, and a change in an output mode according to the second embodiment.

FIG. 12 is a diagram showing an example of a relationship between the degree of importance, a position of the slide mark 32, and a change in the output mode according to the second embodiment.

As shown in FIG. 12, the CPU 11 performs control to change the output mode of the sound from the reporting unit 17 in such a way that the degree of change in output intensity of the sound from the reporting unit 17 increases according to the position of the slide mark 32 as shown in a graph 40 as an example as the degree of importance becomes relatively higher. Specifically, in a case in which the degree of importance is "high", the sound is greatly changed only by slightly moving the slide mark 32. For example, the sound is changed from "ping!" to "beep!". In a case in which the degree of importance is "medium", the output intensity of the sound is changed to some extent when the slide mark 32 is moved to the vicinity of the center, and the output intensity of the sound is further changed when the slide mark 32 is moved to the vicinity of the termination end. For example, the sound is sequentially changed to "ping!", "ping, ping!", and "beep!". Further, in a case in which the degree of importance is "low", even when the slide mark 32 is greatly moved, the volume of the sound is hardly changed, or the volume of the sound is not changed at all.

FIG. 13 is a diagram showing another example of the relationship between the degree of importance, a position of the slide mark 32, and a change in the output mode according to the second embodiment.

As shown in FIG. 13, the CPU 11 performs control to change the output mode of the vibration from the reporting unit 17 in such a way that the degree of change in output intensity of the vibration from the reporting unit 17 increases according to the position of the slide mark 32 as shown in a graph 41 as an example as the degree of importance becomes relatively higher. Specifically, in a case in which the degree of importance is "high", the vibration is greatly changed only by slightly moving the slide mark 32. For example, the vibration is changed from "vrrr!" to "vrrrrr!". In a case in which the degree of importance is "medium", the output intensity of the vibration is changed to some extent when the slide mark 32 is moved to the vicinity of the center, and the output intensity of the vibration is further changed when the slide mark 32 is moved to the vicinity of the termination end. For example, the vibration is sequentially changed to "vrvrrr!", "vrrrr!", and "vrrrrr!". Further, in a case in which the degree of importance is "low", even when the slide mark 32 is greatly moved, the magnitude of the vibration is hardly changed, or the magnitude of the vibration is not changed at all.

Here, in a case in which the slide mark 32 is moved into an execution area 36, the CPU 11 may perform control to change the output intensity of at least one of the sound or the vibration from the reporting unit 17. That is, the corresponding function is executed when the user completes the movement operation on the slide mark 32 (the user releases the finger) at a time point at which the output intensity of at least one of the sound or the vibration from the reporting unit 17 is changed. The position where the movement operation on the slide mark 32 is completed (the finger is released) is grasped by changing the output intensity of at least one of the sound or the vibration from the reporting unit 17.

Further, in the case of returning the slide mark 32 in a direction opposite to a direction from a start area 35 toward the execution area 36, the CPU 11 does not have to perform control to change the output intensity of at least one of the sound or the vibration from the reporting unit 17. As a result, the user is not confused by the change in output intensity of at least one of the sound or the vibration.

The change in the display mode of at least one of the slide mark 32 or the movable area 34 in the first embodiment described above and the change in the output mode of at least one of the sound or the vibration from the reporting unit 17 in the second embodiment may be applied in combination.

As described above, according to the present embodiment, the output mode is changed in such a way that the degree of highlighting of the output mode of at least one of the sound or the vibration from the reporting unit increases according to the position of the operation part as the degree of importance determined by the execution condition for the function executed by the movement operation becomes relatively higher during the movement operation on the operation part by the user. Therefore, the user can grasp that the executed function executed is important during the movement operation.

In the embodiments described above, the processor refers to a processor in a broad sense, and includes a general-purpose processor (for example, a central processing unit (CPU)) or a dedicated processor (for example, a graphics processing unit (GPU), an application specific integrated circuit (ASIC), a field programmable gate array (FPGA), or a programmable logic device).

In addition, the operation of the processor in each embodiment described above may be performed not only by one processor but also by a plurality of processors existing at physically separated positions in cooperation. In addition, the order of the respective operations of the processor is not limited to the order described in each embodiment described above, and may be changed, if appropriate.

The image forming device has been described above as an example of the information processing device according to the embodiment. The embodiment may be in the form of a program for causing a computer to execute the function of each unit included in the image forming device. The embodiment may be in the form of a non-transitory computer-readable storage medium storing these programs.

In addition, the configurations of the image forming device described in the above-described embodiments are only examples, and may be changed according to the situation without departing from the gist.

In addition, the flow of processing of the program described in the above-described embodiments is also an example, and unnecessary steps may be deleted, new steps may be added, or the processing order may be changed without departing from the gist.

Furthermore, in the above-described embodiments, a case in which the processing according to the embodiment is implemented by a software configuration using a computer by executing a program has been described, but the present disclosure is not limited thereto. The embodiments may be implemented by, for example, a hardware configuration or a combination of a hardware configuration and a software configuration.

The disclosure of Japanese Patent Application No. 2021-024345 filed on Feb. 18, 2021 is incorporated herein by reference in its entirety. All documents, patent applications, and technical standards mentioned herein are incorporated herein by reference to the same extent as if each individual document, patent application, and technical standard were specifically and individually stated.

The invention claimed is:

1. An information processing device comprising:
a processor,
wherein the processor:
moves, in a case in which a user performs a movement operation on an operation part displayed on a display unit, the operation part in such a way as to follow the movement operation within a movable area in which the operation part is movable and which includes a start area that does not cause a predetermined function to be executed and an execution area that causes the predetermined function to be executed,
executes the predetermined function in a case in which the movement operation is completed after the operation part is moved from the start area into the execution area by the movement operation, and
performs control to change a reporting mode related to the movement operation in such a way that a degree of highlighting of the reporting mode related to the movement operation increases according to a position of the operation part as a degree of importance determined by an execution condition for the predetermined function becomes relatively higher during the movement operation on the operation part by the user,
wherein the execution condition for the predetermined function is an execution condition set by the user, in a case of executing the function.

2. The information processing device according to claim 1, wherein:
the change in the reporting mode related to the movement operation includes changing a display mode of at least one of the operation part or the movable area, and
the processor performs control to change the display mode of at least one of the operation part or the movable area in such a way that a degree of highlighting of the display mode of at least one of the operation part or the movable area increases according to the position of the operation part as the degree of importance determined by the execution condition for the predetermined function becomes relatively higher.

3. The information processing device according to claim 2, wherein the degree of highlighting of the display mode of at least one of the operation part or the movable area is expressed as a degree of change in color of at least one of the operation part or the movable area.

4. The information processing device according to claim 2, wherein the processor performs control to change the display mode of at least one of the operation part or the movable area according to a type of the predetermined function in a case in which the user touches the operation part.

5. The information processing device according to claim 2, wherein the processor performs control to change the display mode of at least one of the operation part or the movable area in a case in which the operation part is moved into the execution area.

6. The information processing device according to claim 1, wherein:
the change in the reporting mode related to the movement operation includes changing an output mode of at least one of sound or vibration from a reporting unit, and
the processor performs control to change the output mode of at least one of the sound or the vibration from the reporting unit in such a way that a degree of highlighting of the output mode of at least one of the sound or the vibration from the reporting unit increases according to the position of the operation part as the degree of importance determined by the execution condition for the predetermined function becomes relatively higher.

7. The information processing device according to claim 6, wherein the degree of highlighting of the output mode of at least one of the sound or the vibration from the reporting unit is expressed as a degree of change in output intensity, output pattern, or output time of at least one of the sound or the vibration from the reporting unit.

8. The information processing device according to claim 6, wherein the processor performs control to change the output mode of at least one of the sound or the vibration from the reporting unit in a case in which the operation part is moved into the execution area.

9. The information processing device according to claim 6, wherein the processor does not perform control to change the output mode of at least one of the sound or the vibration from the reporting unit in a case of returning the operation part in a direction opposite to a direction from the start area toward the execution area.

10. A non-transitory computer-readable storage medium storing an information processing program for causing a computer to:
move, in a case in which a user performs a movement operation on an operation part displayed on a display unit, the operation part in such a way as to follow the movement operation within a movable area in which the operation part is movable and which includes a start area that does not cause a predetermined function to be executed and an execution area that causes the predetermined function to be executed;
execute the predetermined function in a case in which the movement operation is completed after the operation part is moved from the start area into the execution area by the movement operation; and
perform control to change a reporting mode related to the movement operation in such a way that a degree of highlighting of the reporting mode related to the movement operation increases according to a position of the operation part as a degree of importance determined by an execution condition for the predetermined function becomes relatively higher during the movement operation on the operation part by the user,
wherein the execution condition for the predetermined function is an execution condition set by the user, in a case of executing the function.

\* \* \* \* \*